United States Patent
Putbrese (10) Patent No.: US 9,482,929 B2
(45) Date of Patent: Nov. 1, 2016

(54) SUBAQUATIC MONOPOD FOR PHOTOGRAPHIC EQUIPMENT

(71) Applicant: Nathan Putbrese, North Branc, MN (US)

(72) Inventor: Nathan Putbrese, North Branc, MN (US)

( * ) Notice: Subject to any disclaimer, the term of this patent is extended or adjusted under 35 U.S.C. 154(b) by 0 days.

(21) Appl. No.: 14/636,830

(22) Filed: Mar. 3, 2015

(65) Prior Publication Data

US 2015/0248049 A1    Sep. 3, 2015

Related U.S. Application Data

(60) Provisional application No. 61/947,082, filed on Mar. 3, 2014.

(51) Int. Cl.
  *G03B 17/08* (2006.01)
  *G03B 17/56* (2006.01)
  *F16M 11/24* (2006.01)

(52) U.S. Cl.
  CPC ............ *G03B 17/561* (2013.01); *F16M 11/24* (2013.01)

(58) Field of Classification Search
  CPC .................................................... G03B 17/561
  USPC ............................................................ 396/25
  See application file for complete search history.

(56) References Cited

U.S. PATENT DOCUMENTS

| | | | | |
|---|---|---|---|---|
| 3,324,239 A | * | 6/1967 | Jacobson | 348/81 |
| 2007/0053680 A1 | * | 3/2007 | Fromm | 396/420 |
| 2009/0286432 A1 | * | 11/2009 | Larson et al. | 441/22 |

OTHER PUBLICATIONS

GoPro User Forums; http://goprouser.freeforums.org/gopro-floating-point-of-view-t4160-10.html.*

* cited by examiner

*Primary Examiner* — W B Perkey
*Assistant Examiner* — Dennis Hancock
(74) *Attorney, Agent, or Firm* — Geiser Law, PLLC; Greg N. Geiser (57) ABSTRACT

A subaquatic monopod for photographic equipment is disclosed. The subaquatic monopod is adapted from a standard telescoping monopod. A photographer affixes anchoring weights to a base of the monopod and affixes flotation devices to an upper end of the monopod. The photographer affixes anchoring weights of sufficient mass to hold the base on a bottom surface of a body of water. The underwater photographer affixes flotation devices of sufficient buoyancy to steady the monopod in a vertical position, without lifting the monopod and attached photographic equipment from the bottom surface. The photographer places or "throws" the subaquatic monopod into position on the bottom surface. The photographer can then record photographic images without manually steadying the photographic equipment. The subaquatic monopod optionally includes a ring for attachment of a retrieval line. The retrieval line allows deployment and retrieval from a distance (including by a photographer who is not underwater).

11 Claims, 8 Drawing Sheets

SUBAQUATIC MONOPOD FOR PHOTOGRAPHIC EQUIPMENT

CROSS REFERENCE TO RELATED APPLICATIONS

This application claims priority to U.S. Provisional Patent Application No. 61/947,082 filed 3 Mar. 2014 to the above named inventor, and is herein incorporated by reference in its entirety.

FEDERALLY SPONSORED RESEARCH OR DEVELOPMENT

Not Applicable

SEQUENCE LISTING, A TABLE, OR A COMPUTER PROGRAM

Not Applicable

BACKGROUND OF THE INVENTION

Those engaging in underwater photography generally use hand-held photographic equipment. Like dry-land photographers, however, underwater photographers often benefit from the use of a support mechanism for their photographic equipment such as a tripod. But using a standard tripod underwater is cumbersome, time-consuming, and difficult. In addition, situating a tripod on a bottom surface of a body of water frequently disturbs accumulated silt, creating cloudy water that makes photography difficult or even impossible.

SUMMARY OF THE INVENTION

A subaquatic monopod for photographic equipment embodying the principles of the invention offers underwater photographers a simple, quick, and effective means for supporting their photographic equipment. An underwater photographer can essentially throw the subaquatic monopod onto a bottom surface of a body of water, with a weighted lower end holding the subaquatic monopod into place and a buoyant upper end steadying the subaquatic monopod in a substantially vertical and plumb position.

The subaquatic monopod is adapted from a telescopically expanding and contracting monopod or individual leg of a tripod, well known in the photographic arts. A mounting screw protrudes perpendicularly upward from a top of the monopod. Preferably, the mounting screw has a one-quarter inch diameter and twenty (20) threads per inch, which is a standard size for photographic equipment. The mounting screw can be used for attachment of a wide variety of photographic equipment to the subaquatic monopod, including platforms for simultaneous attachment of multiple pieces of photographic equipment (which allows a possibility of capturing panoramic photographic images up to a full 360 degrees).

The subaquatic monopod includes a means for affixing anchoring weights of varying mass to a base of the subaquatic monopod. In one embodiment of the invention, the means for affixing the anchoring weights to the subaquatic monopod is comprised of a male threaded member protruding perpendicularly downward from the base of the subaquatic monopod. In this embodiment, each of the anchoring weights includes a female threaded receptacle of appropriate dimension to be screwed firmly onto the male threaded member. The underwater photographer can choose one, or a plurality, of the anchoring weights to be screwed onto the male threaded member.

In an alternative embodiment of the invention, the means for affixing the anchoring weights of varying mass to the subaquatic monopod is comprised of a female threaded receptacle affixed to the base of the subaquatic monopod. This alternative embodiment further comprises a bolt-like member of appropriate dimension to be screwed firmly into the female threaded receptacle affixed to the base of the subaquatic monopod. In this alternative embodiment, each of the anchoring weights of varying mass includes an orifice slightly greater size than a threaded portion of the bolt-like member. The underwater photographer can slide the bolt-like member through the orifice of one, or a plurality, of the anchoring weights. The underwater photographer subsequently screws the bolt-like member into the female threaded receptacle affixed to the base of the subaquatic monopod.

In another alternative embodiment of the invention, an end cap is removably affixed to the base of the subaquatic monopod. Each of the anchoring weights of varying mass is sized to be retained within a hollow interior of the lower end of the subaquatic monopod. The hollow interior is accessible upon removal of the end cap from the base of the subaquatic monopod. After removing the end cap, the underwater photographer places the selected anchoring weights within the hollow interior. The anchoring weights are held within the hollow interior when the underwater photographer replaces the end cap on the base of the subaquatic monopod. Other means for affixing the anchoring weights of varying mass to the base of the subaquatic monopod, which would be familiar to those skilled in the art, are included within the scope of the present invention.

The underwater photographer determines an appropriate total combined mass of the anchoring weights to hold the subaquatic monopod firmly to the bottom surface of the body of water. This determination depends on a variety of relevant variables including the mass of the particular photographic equipment being mounted to the subaquatic monopod, density of water, and current of water (if any).

The subaquatic monopod further comprises a means for affixing flotation devices of varying buoyancy to the upper end of the subaquatic monopod. In one embodiment of the invention, the flotation devices are comprised of substantially donut-shaped marine-grade foam, with an inner hole having a diameter slightly larger than a cross-section of the upper end of the subaquatic monopod. The underwater photographer slides the inner hole of the flotation device around the upper end of the subaquatic monopod before photographic equipment is mounted to the mounting screw. Photographic equipment attached to the mounting screw of the subaquatic monopod prevents the flotation devices from sliding off the upper end of the subaquatic monopod. Optionally, the flotation devices are held in place by a retaining ring having a diameter greater than the inner hole of the flotation devices, the retaining ring being affixed to the upper end of the monopod above the flotation devices. Other means for affixing flotation devices of varying buoyancy to the upper end of the subaquatic monopod, which would be familiar to those skilled in the art, are included within the scope of the present invention.

The underwater photographer determines an appropriate total buoyancy of the flotation devices to hold the subaquatic monopod in a substantially vertical and plumb position, without creating a degree of buoyancy to lift the combined weight of the photographic equipment and the subaquatic monopod off the bottom surface. This determination depends on a variety of relevant variables including the mass of the particular photographic equipment being mounted to the subaquatic monopod, density of water, and current of water (if any).

To use the subaquatic monopod, the underwater photographer attaches anchoring weights of sufficient total mass to the base to hold the subaquatic monopod into position on the bottom surface. The underwater photographer also attaches flotation devices to the upper end of the subaquatic monopod of sufficient total buoyancy to steady the subaquatic monopod in a substantially vertical and plumb position (without creating a degree of buoyancy sufficient to lift subaquatic monopod off the bottom surface). The underwater photographer determines the proper balance of weight and buoyancy, depending on the mass of the photographic equipment in use and other relevant variables such as water density and water current (if any). With photographic equipment attached to the subaquatic monopod, the underwater photographer places or "throws" the subaquatic monopod into position on the bottom surface. The underwater photographer can then proceed to record photographic images without a need to manually support the photographic equipment in use. The underwater photographer also has the option to expand or collapse the telescoping monopod as desired.

In an alternative embodiment of the invention, a retrieval-line attachment ring is affixed to the subaquatic monopod. A photographer attaches a first end of a retrieval line to the retrieval-line attachment ring. Preferably, the retrieval line is of a type that would not obstruct a photographic image (such as monofilament line). While retaining a second end of the retrieval line, the photographer (including a photographer who is not underwater) can drop the subaquatic monopod and attached photographic equipment to the bottom surface of the body of water to capture photographic images. When finished capturing photographic images, the photographer can then retrieve the subaquatic monopod and attached photographic equipment by pulling on the retrieval line.

BRIEF DESCRIPTION OF THE SEVERAL VIEWS OF THE PHOTOGRAPHS

The accompanying photographs are included to provide a further understanding of the present invention and are incorporated in and constitute a part of this specification. The photographs illustrate exemplary embodiments of the present invention and together with the description serve to further explain the principles of the invention. Other aspects of the invention and the advantages of the invention will be better appreciated as they become better understood by reference to the Detailed Description when considered in conjunction with accompanying photographs, and wherein.

DETAILED DESCRIPTION OF AN EMBODIMENT OF THE INVENTION

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the terms "front," "back," "rear," "upper," "lower," "right," and "left" in this description are merely used to identify the various elements as they are oriented in the FIGS, with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Referring now to FIGS. 1-10, the subaquatic monopod, generally referred to as 10, is adapted from a monopod shaft 20. Preferably the monopod shaft 20 is telescopically expanding and contracting as is well known in the photographic arts. A mounting screw 21 protrudes perpendicularly upward from a top 22 of the monopod 20. Preferably, the mounting screw 21 has a one-quarter inch diameter and twenty (20) threads per inch, which is a standard size for photographic equipment. The mounting screw 21 can be used for attachment of a wide variety of photographic equipment 90 to the subaquatic monopod 10, including platforms for simultaneous attachment of multiple pieces of photographic equipment.

The subaquatic monopod 10 includes a means for affixing anchoring weights 30 of varying mass to a base 25 of the subaquatic monopod 10. In an embodiment of the invention shown most clearly in FIGS. 1, and 6-7, the means for affixing the anchoring weights 30 to the subaquatic monopod 10 is comprised of a male threaded member 32 protruding perpendicularly downward from the base 25 of the subaquatic monopod 10. In this embodiment, each of the anchoring weights 30 includes a female threaded receptacle 31 of appropriate dimension to be screwed firmly onto the male threaded member 32. An underwater photographer can choose one, or a plurality, of the anchoring weights 30 to be screwed onto the male threaded member 32.

The underwater photographer determines an appropriate total combined mass of the anchoring weights 30 to hold the subaquatic monopod 10 firmly to a bottom surface of a body of water. This determination depends on a variety of relevant variables including the mass of the particular photographic equipment 90 being mounted to the subaquatic monopod 10, density of water, and current of water (if any).

Figure 1:
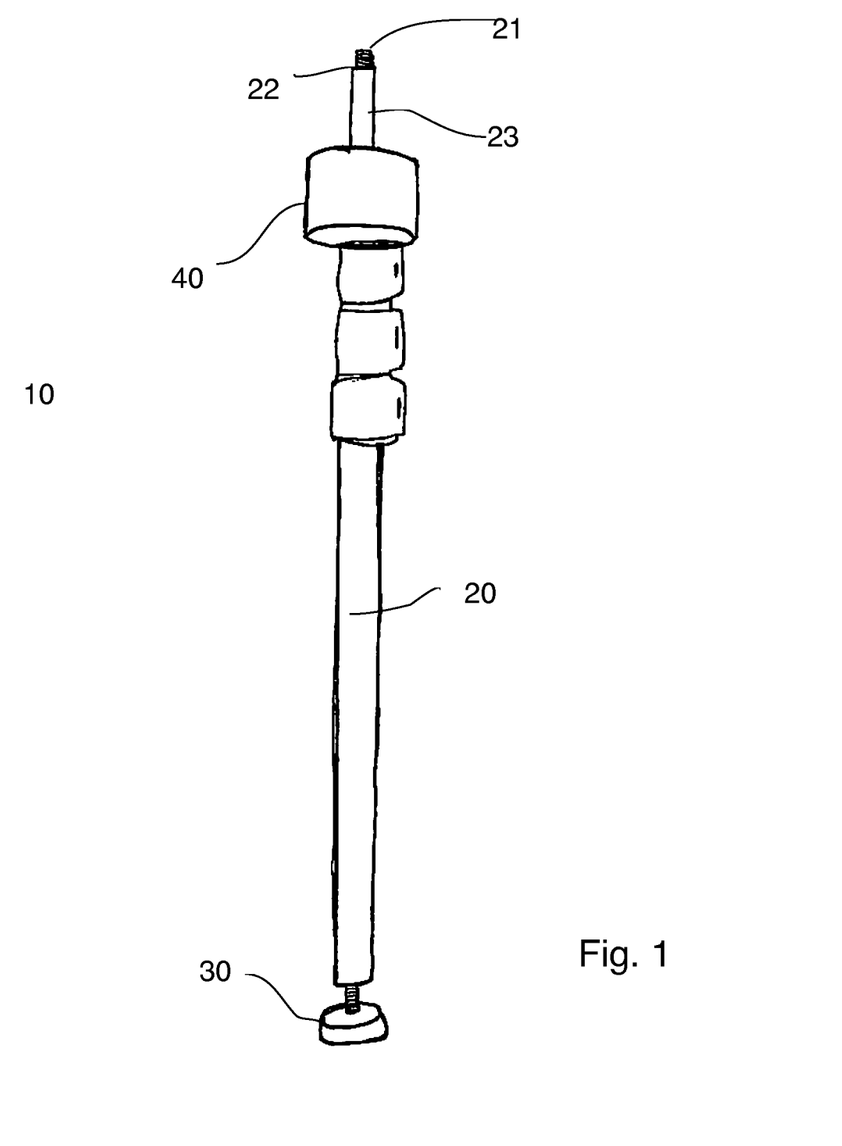
FIG. 1 is a side view the subaquatic monopod according to the present invention in a retracted position.
Figure 2:
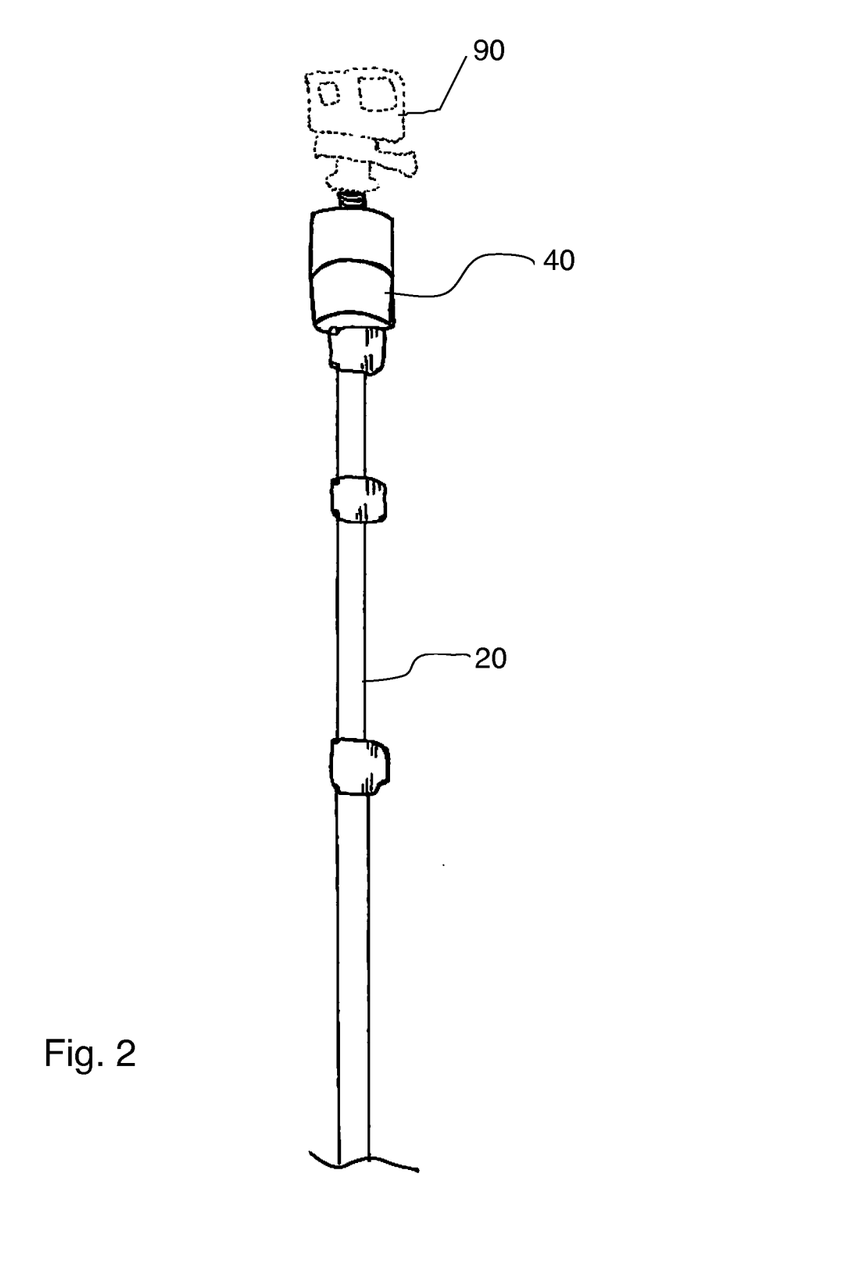
FIG. 2 is a side view of an upper portion of the monopod according to the present invention in an extended position.
Figure 3:
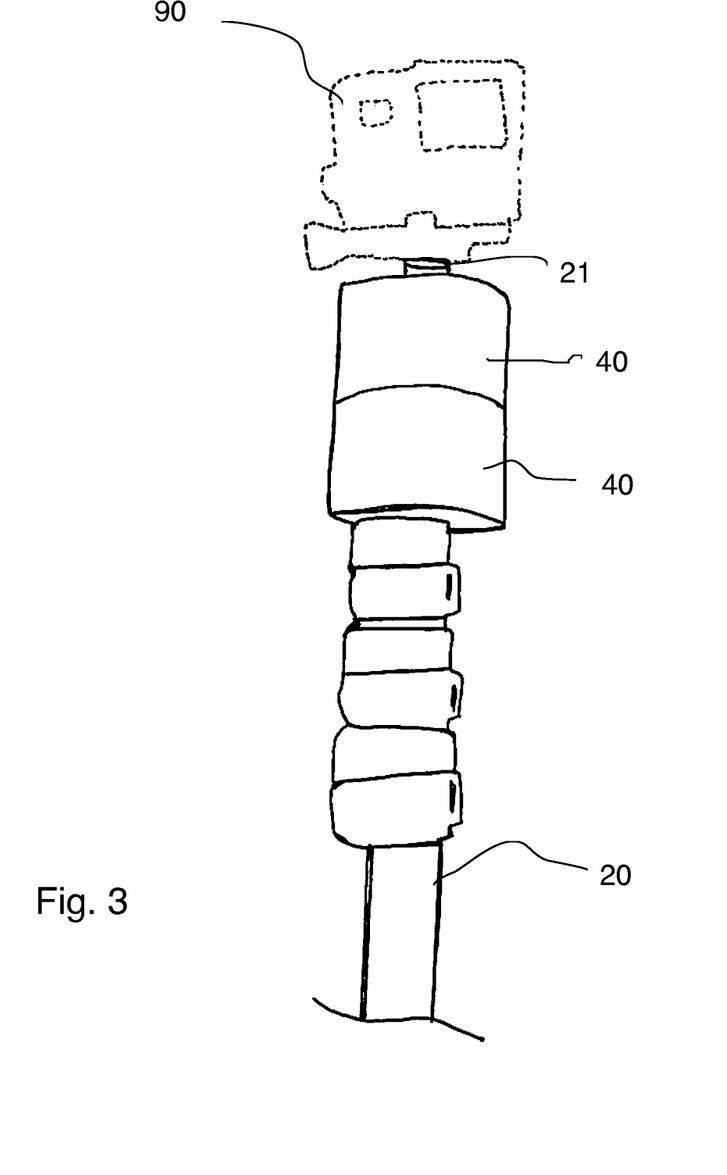
FIG. 3 is a side view of an upper portion of the monopod according to the present invention in a retracted position.
Figure 4:
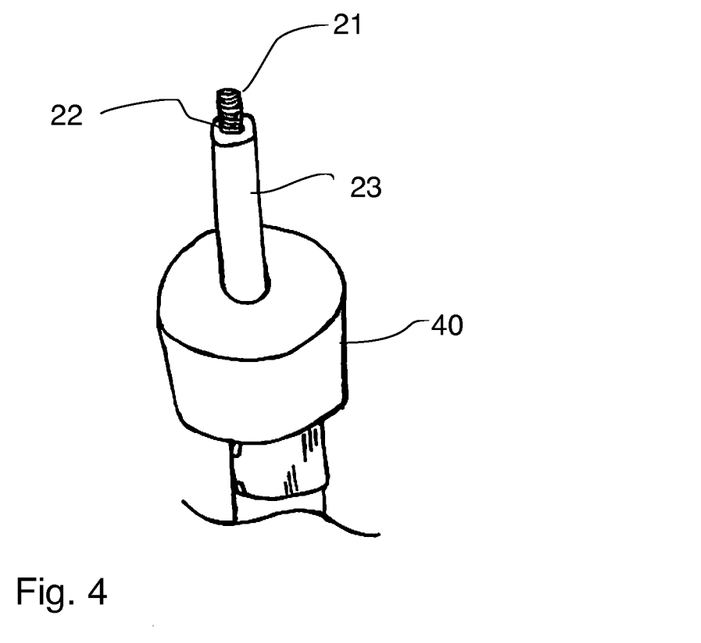
FIG. 4 is an exploded view of the upper portion of the monopod according to the present invention with a flotation device.
Figure 5:
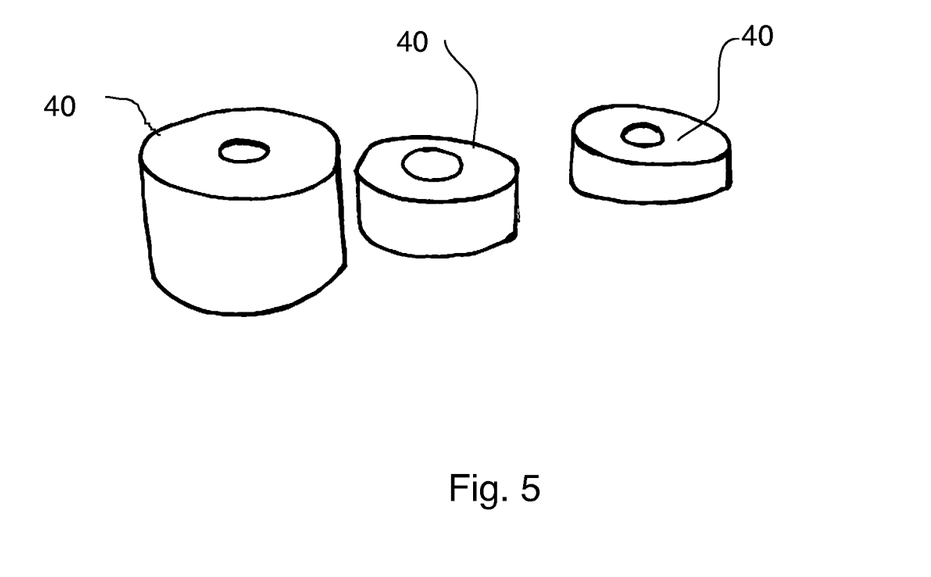
FIG. 5 is an isometric view of various flotation devices according to the present invention.
Figure 6:
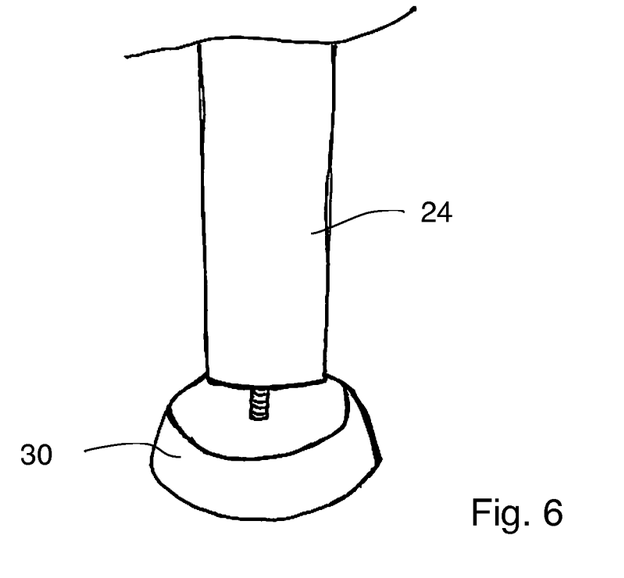
FIG. 6 is an exploded view of the lower portion of the monopod according to the present invention.
Figure 7:
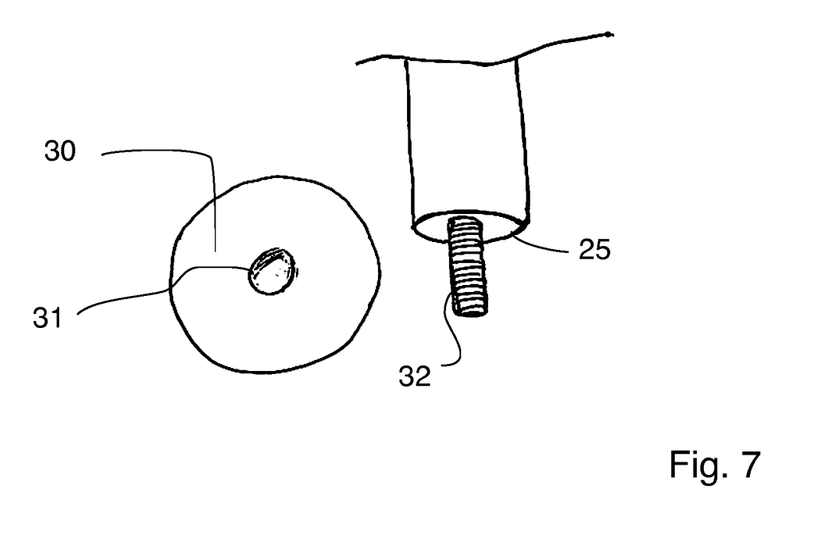
FIG. 7 is an exploded view of the lower portion of the monopod according to the present invention, with a weight portion removed.

The subaquatic monopod 10 further comprises a means for affixing flotation devices 40 of varying buoyancy to the upper end 23 of the subaquatic monopod 10. In an embodiment of the invention shown most clearly in FIGS. 4-5, the flotation devices 40 are comprised of ring-shaped marine-grade foam, with an inner aperture 41 having a diameter slightly larger than a cross-section of the upper end 23 of the subaquatic monopod 10. The underwater photographer slides the inner hole 41 of the flotation device 40 around the upper end 23 of the subaquatic monopod 10 before photographic equipment 90 is mounted to the mounting screw. As shown in FIGS. 2-3, photographic equipment 90 attached to the mounting screw 21 of the subaquatic monopod 10 prevents the flotation devices 40 from sliding off the upper end 23 of the subaquatic monopod 10.

Figure 10:
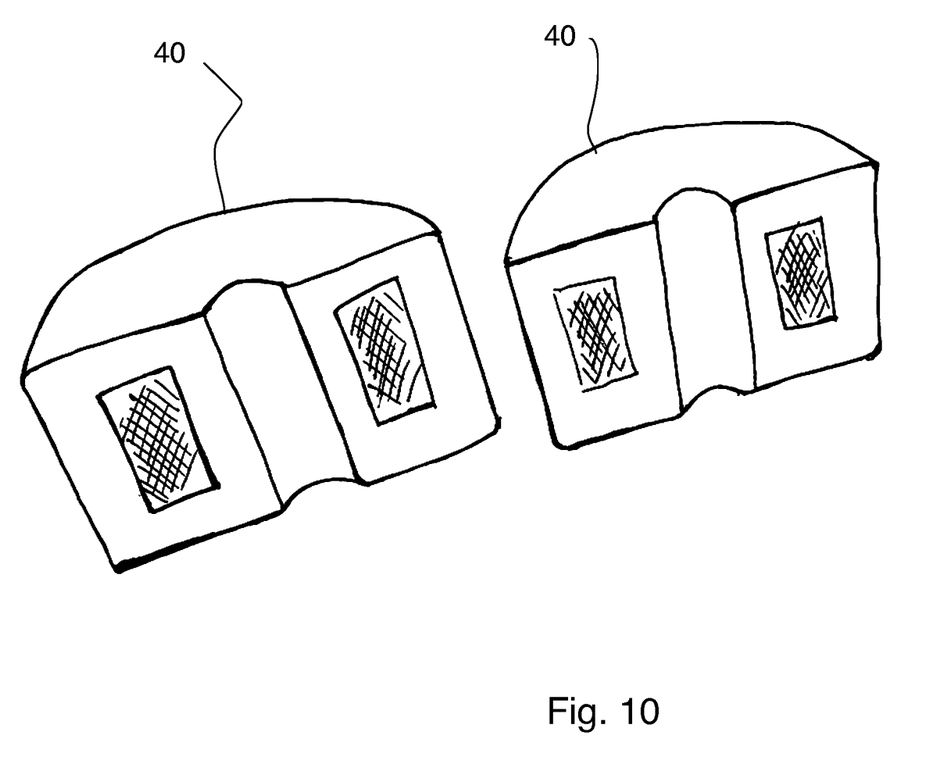
FIG. 10 is isometric view of an alternate embodiment of the flotation device according to the present invention.

In an alternate embodiment, as shown in FIG. 10, the floatation device 40 is comprised of two separate halves removably affixed to each other. Accordingly, these halves can be placed around the monopod shaft 20 without the removal of the camera equipment 90. Any number of materials may be affixed to the inner portion of the floatation ring to allow for this removable attachment, with a hook and loop style fastener being preferred.

The underwater photographer determines an appropriate total buoyancy of the flotation devices 40 to hold the subaquatic monopod 10 in a substantially vertical position, without creating a degree of buoyancy to lift the combined weight of the photographic equipment 90 and the subaquatic monopod 10 off the bottom surface. This determination depends on a variety of relevant variables including the mass of the particular photographic equipment 90 being mounted to the subaquatic monopod 10, density of water, and current of water (if any).

To use the subaquatic monopod 10, the underwater photographer attaches anchoring weights 30 of sufficient total mass to the base 25 to hold the subaquatic monopod 10 into position on the bottom surface. The underwater photographer also attaches flotation devices 40 to the upper end 23 of the subaquatic monopod 10 of sufficient total buoyancy to steady the subaquatic monopod 10 in a substantially vertical and plumb position (without creating a degree of buoyancy sufficient to lift subaquatic monopod 10 off the bottom surface). The underwater photographer determines the proper balance of weight and buoyancy, depending on the mass of the photographic equipment 90 in use and other relevant variables such as water density and water current (if any). With photographic equipment attached to the subaquatic monopod 10, the underwater photographer places or "throws" the subaquatic monopod 10 into position on the bottom surface. The underwater photographer can then proceed to record photographic images without a need to manually steady the photographic equipment in use. The underwater photographer also has the option to expand or retract the telescoping monopod 20 as desired.

Figure 8:
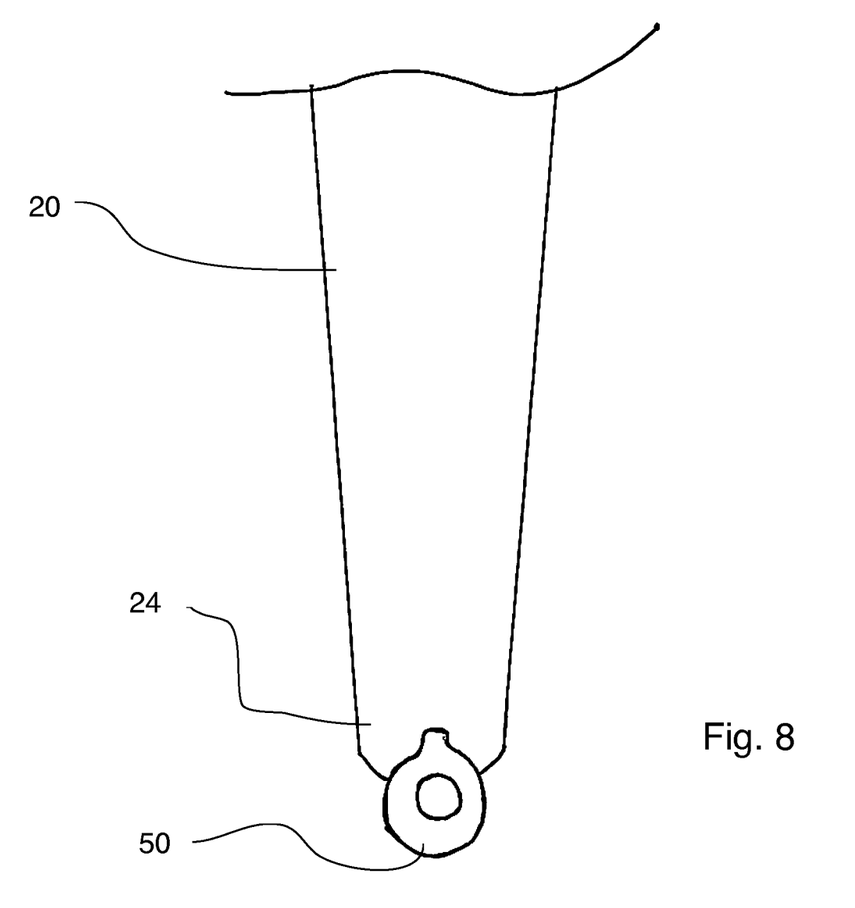
FIG. 8 is a side view of an alternate embodiment of the monopod with a retrieval-line attachment ring affixed to the monopod, according to the present invention.
Figure 9:
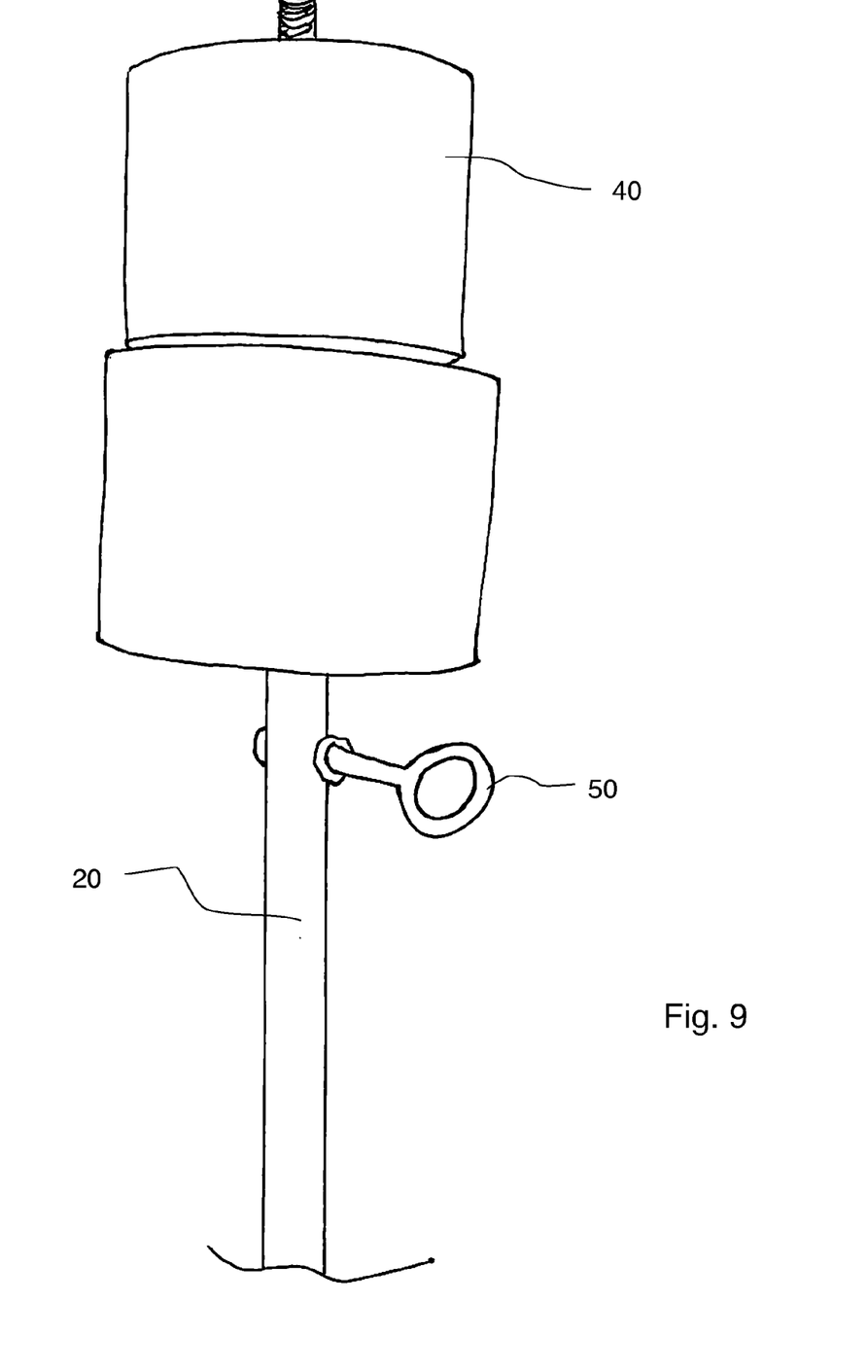
FIG. 9 is a side view of the upper portion of the alternate embodiment of the monopod according to the present invention.

In an alternative embodiment of the present invention, as shown in FIGS. 8-9, a retrieval-line attachment ring 50 is affixed to the subaquatic monopod 10. A photographer attaches a first end of a retrieval line (not shown) to the retrieval-line attachment ring 50. To allow for the collapsing and expanding of the monopod shaft 20, it is preferred that this attachment ring 50 be placed near an end of the shaft 20.

Preferably, the retrieval line (not shown) is of a type that would not obstruct a photographic image (such as monofilament line). While retaining a second end of the retrieval line (not shown), the photographer (including a photographer who is not underwater) can drop the subaquatic monopod 10 and attached photographic equipment 90 to the bottom surface of the body of water to capture photographic images. When finished capturing photographic images, the photographer can then retrieve the subaquatic monopod 10 and attached photographic equipment 90 by pulling on the retrieval line (not shown).

What is claimed is:

1. A monopod for supporting photographic equipment in an subaquatic environment in a resting state on a bottom surface of the subaquatic environment, the monopod comprising:
    a shaft portion, the shaft portion having a upper end and a lower end, the upper end including an attachment means, the attachment means capable of receiving a mount for the affixation of camera equipment;
    a weighted member, the weighted member in communication with the lower end and anchoring the monopod on the bottom surface; and
    a flotation device, the floatation device buoyant and removably received on the shaft portion, wherein the flotation device supports the photographic equipment in an upright postion on the bottom surface of the water.

2. A monopod as in claim 1, wherein the shaft portion includes a collapsing/expanding middle section, the collapsing/expanding middle section allowing for adjustment of the height of the monopod.

3. A monopod as in claim 1, wherein the shaft includes an attachment ring, the attachment ring allowing for the attachment of a retrieval line.

4. A monopod as in claim 1, wherein the flotation device comprises a ring, the ring having an aperture corresponding to the diameter of the monopod shaft.

5. A monopod as in claim 1, wherein the floatation device is comprised of marine grade foam.

6. A monopod as in claim 5, wherein the flotation device is composed of two separate halves, each half removably affixed to the other half.

7. A monopod for supporting photographic equipment in an subaquatic environment in a resting state on a bottom surface of the subaquatic environment, the monopod comprising:
    a collapsing/expanding shaft portion, the shaft portion having a upper end and a lower end, the upper end including an attachment means, the attachment means capable of receiving a mount for the affixation of camera equipment;
    a weighted member, the weighted member removable and in communication with the lower end, the weighted member anchoring the monopod on the bottom surface; and
    a flotation device, the floatation device buoyant and removably received on the shaft portion, wherein the flotation device supports the photographic equipment in an upright position on the bottom surface of the body of water.

8. A monopod as in claim 7, wherein the shaft includes an attachment ring, the attachment ring allowing for the attachment of a retrieval line.

9. A monopod as in claim 7, wherein the flotation device comprises a ring, the ring having an aperture corresponding to the diameter of the monopod shaft.

10. A monopod as in claim 7, wherein the floatation device is comprised of marine grade foam.

11. A monopod as in claim 10, wherein the flotation device is composed of two separate halves, each half removably affixed to the other half.

* * * * *